Burton A. Jones
Larry E. Fidler
INVENTORS.

Burton A. Jones
Larry E. Fidler
INVENTORS.

United States Patent Office 3,311,306
Patented Mar. 28, 1967

3,311,306
MONOSTABLE HOT GAS VALVE
Burton A. Jones, North Palm Beach, Fla., and Larry E. Fidler, Lakeside, Calif., assignors, by mesne assignments, to the United States of America as represented by the Secretary of the Navy
Filed May 4, 1965, Ser. No. 453,896
6 Claims. (Cl. 239—265.27)

This invention relates to the art of rocket propulsion. More particularly, the invention relates to a rocket propulsion system having provision for thrust vector control.

Rocket propelled vehicles are normally steered by varying the direction of the thrust vector to introduce a turning moment about the center of gravity of the vehicle. Various devices have been employed for this purpose heretofore, such as swivel nozzles, jet vanes, jetavators and the like. Secondary injection techniques utilizing boundary layer separation effects have also been used to advantage, these systems eliminating many of the disadvantages of the prior art mechanical systems by reducing the number of parts and the complexity of these devices. The use of so called pure fluid devices to further simplify the chamber-bleed type of secondary injection system has also been suggested. For example, see Holmes, "Rocket Thrust Vectoring," D.O.F.L. Fluid Amplification Symposium, vol. 1, Oct. 2-4, 1962, pages 73–78.

It is an object of the present invention to provide a thrust vector control system for a rocket propelled vehicle which is of the latter type, employing a "pure fluid" valve or at least one which employs a minimum number of moving parts.

This and other objects of the invention are achieved by the provision of a system in which control fluid is tapped from a portion of the thrust nozzle itself under the control of a monostable valve and is then supplied to another portion of the nozzle to effect the desired steering. The monostable valve is simple in construction and requires a single control consisting of either a pressure bleed line or a mechanical deflector. Injection of a pressurized control fluid, from the output of a pure-fluid guidance system, for example, may also be employed.

Other objects, advantages and new features of the present invention will become apparent from a consideration of the following detailed description when read in conjunction with accompanying drawings wherein.

Figure 1:
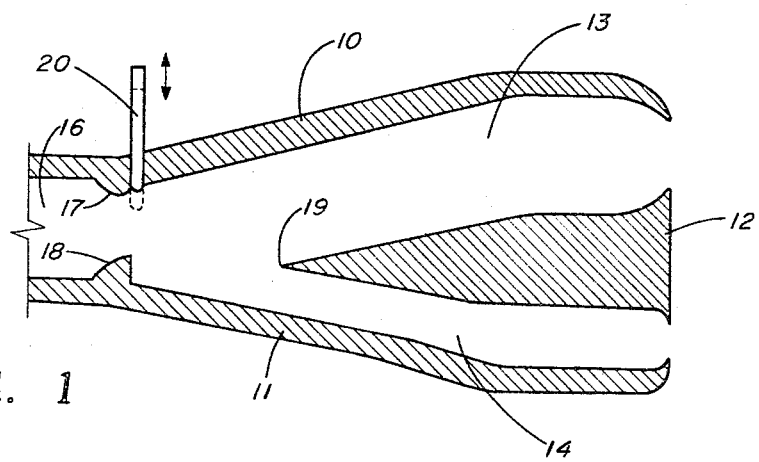
FIG. 1 is a cross-section through a monostable valve of the general type used in the present invention.

Referring now to FIG. 1, the structure of the monostable valve per se will be described. It will be understood that the valves used in all of the specific embodiments to be described hereinafter will utilize a valve of this kind. As diagrammatically shown in FIG. 1, the valve consists of walls 10 and 11 and a flow divider 12 defining two diverging flow passages 13 and 14. It will be understood that there are walls not shown which define closed cross-sections for the flow passages 13 and 14. An inlet passageway 16 is provided for supplying fluid under pressure to the valve. Fluid flow is normally confined to passage 13 by the construction of the fixed, rigid portions of the device. The flow is directed toward passage 13 by a converging nozzle defined by surfaces 17 and 18. Flow divider 12 aids in keeping flow in passage 13 since its apex 19 is positioned asymmetrically with respect to the center line of the converging nozzle, as shown.

A movable control tab 20 is guided in wall 10 for reciprocating movement to control the flow through the passageways 13 and 14. When the tab 20 is fully retracted, that is, in its uppermost position as seen in FIG. 1, all fluid will flow through passage 13. When the tab is inserted into the flowing stream, fluid is deflected downwardly and part or all of it will enter the passage 14, depending on the position of tab 20. Upon withdrawal of tab 20, flow will revert back to the passage 13.

Figure 2:
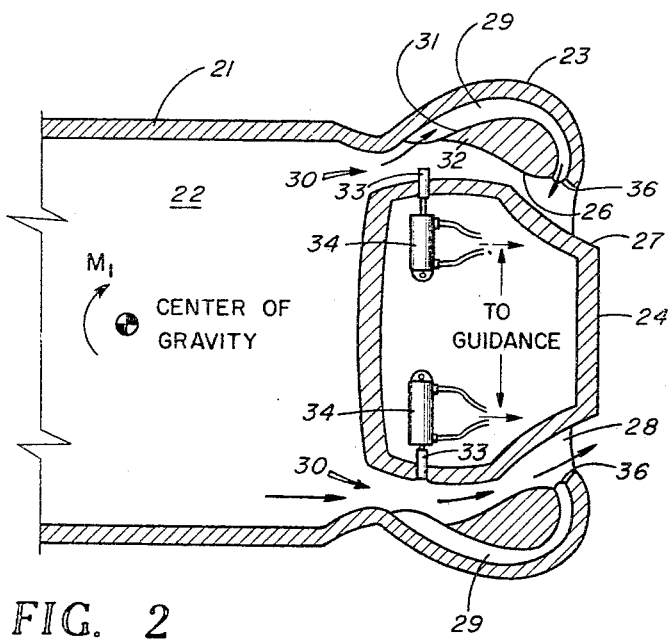
FIG. 2 is a cross-section through the propulsion end of a rocket motor embodying the present invention.

FIG. 2 is illustrative of one embodiment of the present invention. This figure shows a plug nozzle propulsion system for a rocket having a cylindrical casing 21 and a combustion chamber 22. Cylindrical wall 21 terminates, at the rearward portion of the rocket, in an annular wall 23. A plug 24 is supported in any suitable manner in the rear end of the rocket. Surface 26 on annular wall 23 and an isentropic surface 27 on plug 24 define an annular thrust nozzle 28.

Communicating between a higher pressure, upstream portion of the thrust nozzle 28 and a lower pressure, downstream portion thereof are a plurality of secondary control passages 29. Passages 29 are arranged in an annular array around the thrust nozzle in order to provide thrust vector control in three dimensions as will be understood by those skilled in the art. Fluid is directed into the control passages 29 in selective manner by means of monostable valves of the type described above. To this end, the configuration of the inlet portion 30 of thrust nozzle 28 is arranged to direct flow normally entirely through the thrust nozzle 28. The corresponding secondary flow passage extends at an angle to the thrust nozzle and the adjacent surfaces of the passage, 31, and of the thrust nozzle, 26, intersect to form a flow divider 32 comparable to flow divider 12 of the FIG. 1 showing. In order to divert flow into the passages 29, an immersible tab 33 is provided opposite each of the openings 32. The various tabs 33 are selectively moved by means of hydraulic motors 34 which are responsive to guidance information.

At their downstream ends, passages 29 terminate in control orifices 36, which are arranged to project control fluid into a direction substantially transverse to the outflow direction of thrust nozzle 28. In this manner, the thrust vector at this point and the control jet vector combine to vary the resultant direction of the thrust.

In the operation of the embodiment of FIG. 2, with the tabs 33 all in their retracted positions, all fluid flows through the thrust nozzle 28 and expands along isentropic surface 27 in conventional manner. If it is desired to effect a turning maneuver of the rocket, the guidance or steering system will supply a signal to the motors 34 of the selected tabs 33, which will then be immersed in the flowing fluid. Fluid will be deflected into the secondary flow passages 29 and will be emitted from the corresponding control nozzles 36 to vary the direction of the thrust in the desired manner. This will result in a turning moment about the rocket's center of gravity.

Figure 3:
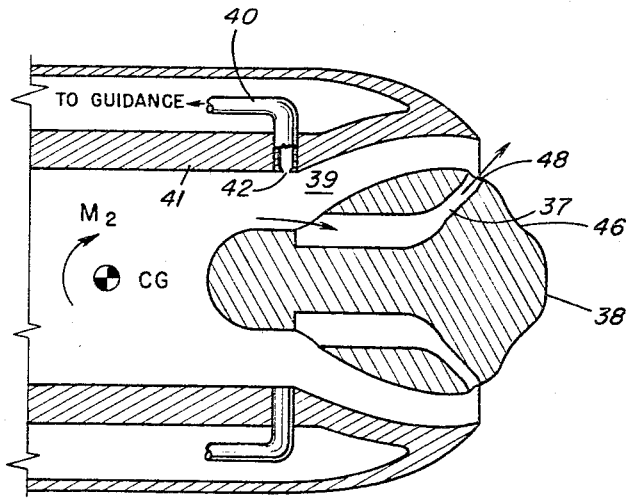
FIG. 3 is a cross-section through another embodiment of the invention.

FIG. 3 illustrates a second embodiment of the present invention. In this embodiment, the control passages 37 are formed in the plug 38. The main thrust passage in this embodiment is designated by reference numeral 39. Control in this embodiment is obtained by means of a fluid control jet from a conduit 40 which terminates in a control orifice 42 in the annular wall 41. Fluid may be supplied to conduit 40 in any desired manner, as by connecting conduit 40 to the output of a pure fluid guidance computer, for example.

The operation of the embodiment of FIG. 3 is much the same as that of FIG. 2. Thrust fluid flow is normally in the thrust passage 39 when no control fluid is applied. The application of a control jet deflects a portion of the flow into passage 37 and then out of control orifice 48 in a direction transverse to the flow stream. The thrust vector at the location of the orifice 48 is therefore deflected outwardly, resulting in a turning moment about the center of gravity.

Figure 4:
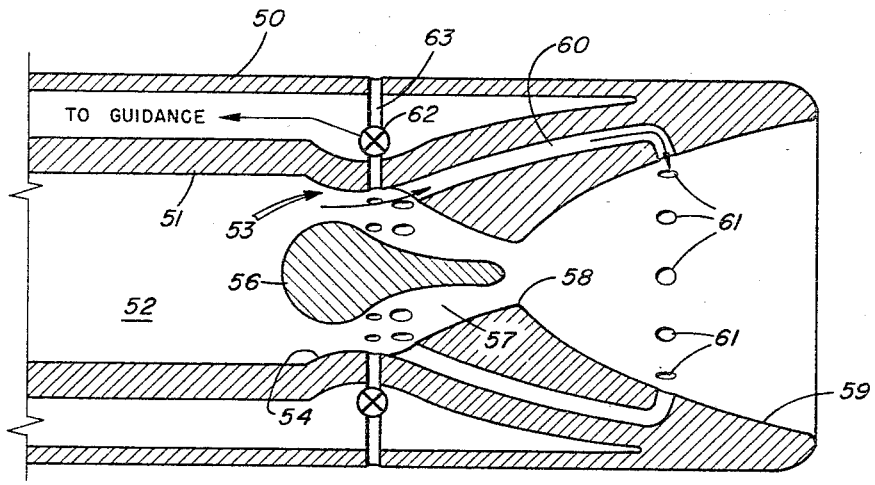
FIG. 4 is a cross-sectional showing still another embodiment of the invention.

FIG. 4 illustrates still another propulsion system to which the present invention may be applied. In this system, the rocket has a case 50 having a wall 51 and a combustion chamber 52. An annular supersonic nozzle 53 is defined by a surface 54 on wall 51 and a central plug 56. Surface 54 and plug 56 also define a diffusion section 57. Downstream of diffusion section 57 is a primary nozzle throat 58 and an expansion section 59. Secondary injection ducts 60 begin near the supersonic portion of the nozzle and terminate in a plurality of secondary injection ports 61 in an annular array in the expansion section 59. As with the other embodiments, the structure of the nozzle is such that flow is normally in the main passages when no control is applied. In the embodiment of FIG. 4, fluid may be deflected into the control passages 60 by actuation of valves 62 in atmospheric bleed lines 63, one of which is provided for each of the control passages 60. It will be understood that control tabs or injection jets may be employed instead of the external bleed passages 63, in which case the control means would be placed in the plug 56.

Obviously many modifications and variations may be made in the invention in the light of the above teachings. Accordingly, it is to be understood that within the scope of the appended claims the invention may be practiced otherwise than as specifically described.

What is claimed is:

1. A thrust vector control system for a rocket motor having a thrust nozzle comprising
   means defining a plurality of secondary flow passages communicating between an upstream, higher pressure portion of said exhaust nozzle and a downstream lower portion thereof,
   means defining a plurality of monostable valves, one at the upstream end of each of said secondary passages, each of said valves having an inlet portion arranged to project flow into said thrust nozzle,
   the corresponding secondary flow passage extending at an angle to said thrust nozzle, the adjacent surfaces of the secondary flow passage and the thrust nozzle intersecting to form a flow divider,
   means for selectively actuating said valves to deflect exhaust fluid into selected ones of said secondary flow passages for steering purposes, and
   means on the side of said thrust nozzle opposite said secondary flow passage for deflecting the fluid stream toward said flow divider and into said secondary flow passage.

2. A thrust vector control system as defined in claim 1 wherein each of said secondary flow passages terminates in a control orifice which is arranged to project fluid into a direction substantially transverse to the outflow direction of said thrust nozzle.

3. A thrust vector control system for a rocket motor having a thrust nozzle having an outer wall and a coaxial plug comprising
   a plurality of secondary flow passages in said outer wall, communicating between an upstream, higher-pressure portion of said thrust nozzle and a downstream lower-pressure portion thereof,
   means defining a plurality of monostable valves, one at the upstream end of each of said secondary flow passages, and
   means for selectively actuating said valves to deflect exhaust fluid into selected ones of said secondary flow passages for steering purposes.

4. A thrust vector control system for a rocket motor having an annular thrust nozzle defined by an annular outer wall and a coaxial plug member, comprising,
   a plurality of secondary flow passages in said outer wall, communicating between an upstream, higher-pressure portion of said thrust nozzle and a downstream, lower-pressure portion thereof,
   a plurality of monostable valves, one at the upstream end of each of said secondary flow passages, each of said monostable valves comprising means normally directing all fluid to said thrust nozzle and means for deflecting fluid into the corresponding secondary flow passage for thrust vector control,
   each of said secondary flow passages terminating in a thrust vector control nozzle oriented to direct a jet transversely across said thrust nozzle.

5. A thrust vector control system for a rocket motor having an annular thrust nozzle defined by an annular outer wall and a coaxial plug member, comprising
   a plurality of secondary flow passages in said coaxial plug, communicating between an upstream, higher-pressure portion of said thrust nozzle and a downstream, lower-pressure portion thereof,
   a plurality of monostable valves, one at the upstream end of each of said secondary flow passages, each of said monostable valves comprising means normally directing all fluid to said thrust nozzle and means for deflecting fluid into the corresponding secondary flow passage for thrust vector control,
   each of said flow passages terminating in a thrust vector control nozzle oriented to direct a jet transversely across said exhaust nozzle.

6. A thrust vector control system for a rocket motor having a thrust nozzle consisting of an outer wall and a coaxial plug member defining an annular supersonic nozzle, a diffusion section, a main throat and a divergent expansion section comprising
   a plurality of secondary flow passages in said outer wall, communicating with said thrust nozzle at the supersonic portion thereof at their upstream ends and with said expansion section at their downstream ends,
   means defining a plurality of monostable valves, one at the upstream end of each of said secondary flow passages, each of said monostable valves comprising means normally directing all fluid to said thrust nozzle and means for deflecting fluid into the corresponding secondary flow passage for thrust vector control,
   each of said flow passages terminating in a secondary injection port in the wall of said expansion section.

References Cited by the Examiner
UNITED STATES PATENTS 3,204,405  9/1965  Warren et al. _____ 60—35.54

EVERETT W. KIRBY, *Primary Examiner.*